(12) United States Patent
Chavez et al.

(10) Patent No.: US 6,333,619 B1
(45) Date of Patent: Dec. 25, 2001

(54) CYCLICAL BATTERY CHARGER WITH INCREMENTAL AND DECREMENTAL CURRENT AND A METHOD OF OPERATION THEREOF

(76) Inventors: Jaime H Chavez, 1023 Sir Lancelot Cir., Lewisville, TX (US) 75056; Dibyendu N. Nath, 7213 Randall Way, Plano, TX (US) 75025; Paul S. Nessman, 1925 Bent Brook Dr., Mesquite, TX (US) 75181; Gabriel G. Suranyi, 5908 Pathfinder Dr., Plano, TX (US) 75093

(*) Notice: Subject to any disclaimer, the term of this patent is extended or adjusted under 35 U.S.C. 154(b) by 0 days.

(21) Appl. No.: 09/525,390

(22) Filed: Mar. 15, 2000

(51) Int. Cl.$^7$ .................................................. H02J 7/00
(52) U.S. Cl. ................................ 320/125; 320/160
(58) Field of Search ................................. 320/125, 160, 320/166, 137, 129, 139, 152

(56) References Cited

U.S. PATENT DOCUMENTS

| | | | |
|---|---|---|---|
| 3,614,583 | * 10/1971 | Burkett | 320/129 |
| 5,461,297 | * 10/1995 | Crawford | 320/166 |

* cited by examiner

Primary Examiner—Peter S. Wong
Assistant Examiner—Lawrence Luk

(57) ABSTRACT

A battery charger, a method of charging a battery and a battery plant incorporating the battery charger or the method. In one embodiment, the battery charger includes: (1) a battery voltage monitor that measures a voltage of a battery and (2) a charge current generator, coupled to the battery voltage monitor, that provides an incrementally adjustable charge current to the battery based on the voltage.

21 Claims, 2 Drawing Sheets

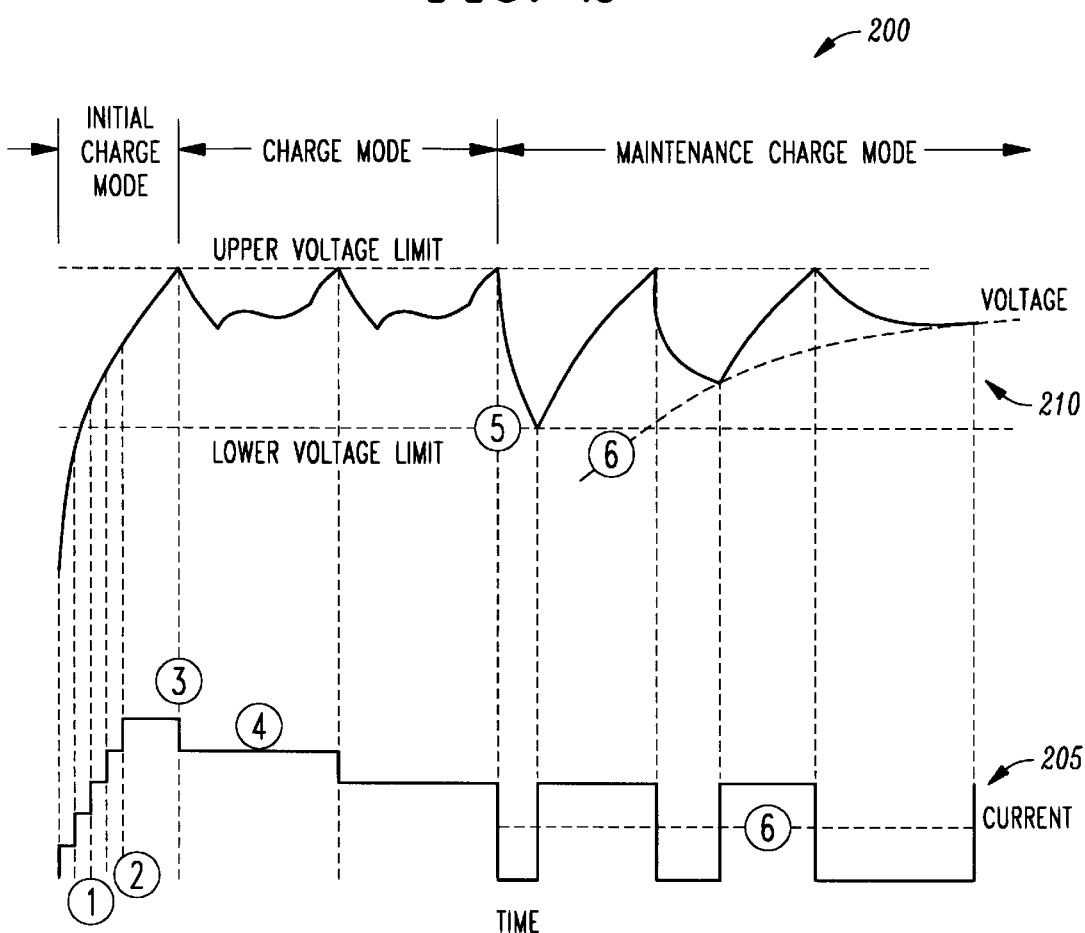

CYCLICAL BATTERY CHARGER WITH INCREMENTAL AND DECREMENTAL CURRENT AND A METHOD OF OPERATION THEREOF

TECHNICAL FIELD OF THE INVENTION

The present invention is directed, in general, to batteries and, more specifically, to a cyclical battery charger capable of providing incremental and decremental currents and a method of operation thereof.

BACKGROUND OF THE INVENTION

Electronic systems, whether in telecommunications, data processing or other industries requiring operational capability at all times, necessitate the use of reserve power to accommodate the times when an AC power source outage occurs. This typically implies that a battery or a collection or "string" of batteries is required to supply the needed interim power. Often, the environment in which the batteries must operate provides harsh conditions that are extremely detrimental to them. Therefore, a battery monitoring system is typically used to monitor and condition them. The goal of the battery monitoring system is to protect the batteries from being damaged, provide a conditioning or recharging environment and ultimately extend useful battery life.

Parameters that are detrimental to batteries include: a large or uncontrolled charge current, a constant value of charging voltage that is too high, a high battery temperature that causes the battery to vent gas, shorted battery cells that force others to overcharge and conditions that overly discharge the battery. Conventional battery monitoring and conditioning systems are focused on simplicity of operation regardless of any degenerative impact that they may have on the batteries themselves. For example, a conventional battery monitoring and conditioning system may provide a single value of charging current during an initial phase of charging. This single value of charging current is typically maximized to assure that the batteries are charged quickly.

The maximum value of this current is often limited only by the internal resistance of the batteries themselves. A large value of battery charging current produces a high likelihood that the batteries will overheat. Overheating of the batteries causes their internal resistance to decrease further thereby allowing the charging current to further increase. This process, if unchecked, often produces a thermal runaway condition that either partially or severely damages the batteries. Even if the batteries do not enter a thermal runaway condition, a "thermal event" may exist wherein one or more of the batteries becomes overheated and vents gas to the environment causing those batteries to dry out over time.

After the batteries have reached a fully charged state under these conditions, the charge current is typically reduced in value, and the battery voltage usually decreases to a maintained value. Over time, battery cells that have been damaged by this charging process may become shorted. A shorted battery cell can no longer properly store energy, forces other batteries to overcharge and therefore usually requires that the battery or batteries be removed and discarded. Although simple in operation, this type of battery monitoring and conditioning system treats all batteries in the same way and usually monitors the voltage condition of the battery only to determine the presence of a shorted cell.

Accordingly, what is needed in the art is an improved way to monitor and condition batteries that avoids thermal events and allows the batteries to reach their full energy capacity.

SUMMARY OF THE INVENTION

To address the above-discussed deficiencies of the prior art, the present invention provides a battery charger, a method of charging a battery and a battery plant incorporating the battery charger or the method. In one embodiment, the battery charger includes: (1) a battery voltage monitor that measures a voltage of a battery and (2) a charge current generator, coupled to the battery voltage monitor, that provides an incrementally adjustable charge current to the battery based on the voltage.

The present invention therefore introduces the broad concept of basing adjustments to charge current levels on battery voltage, such that the rate at which the battery charger charges a battery depends upon the response of the battery. The battery charger can monitor any voltage associated with the battery. However, in an embodiment to be illustrated and described, the battery charger monitors a voltage of a battery at its terminals. The voltage measured can be instantaneous, a change in voltage over time (a slope) or any derivative thereof.

In one embodiment of the present invention, the charge current generator operates in an initial charge mode in which the incrementally adjustable charge current assumes one of at least two intermediate levels based on the voltage. In an embodiment to be illustrated and described, the battery charger assumes one of four intermediate levels, in addition to zero and a maximum level. The intermediate and maximum levels can be set at any absolute value and do not need to be evenly spaced apart.

In one embodiment of the present invention, the charge current generator operates in an initial charge mode in which the incremental adjustable charge current decrements each time the voltage reaches an upper limit. The upper limit can be set at any absolute value, and may be caused to change over time in some embodiments of the present invention.

In one embodiment of the present invention, the charge current generator operates in a maintenance mode in which the incrementally adjustable charge current toggles from zero to a single higher value when the voltage reaches a lower limit. In an embodiment to be illustrated and described, the single higher level is one of the four illustrated intermediate levels, although this need not be the case.

In one embodiment of the present invention, the charge current generator increases the lower limit over time. The lower limit can increase to accommodate an increase in capacity of the battery over time. The present invention does not require that the lower limit rise, and is not limited to a particular time to initiate a rise or rate of rise.

In one embodiment of the present invention, the charge current generator operates in a maintenance mode in which the incremental adjustable charge current toggles to zero from a single higher value when the voltage reaches an upper limit. In an embodiment to be illustrated and described, the upper limit is the same as in the initial charge mode.

In one embodiment of the present invention, a discharge event causes the battery charger to shift from a maintenance mode to an initial charge mode. The discharge event may be defined by a battery voltage excursion of a given minimum magnitude or rate or over a given period of time.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 2 illustrates a waveform showing representative voltage and current waveforms for the battery charger of FIG. 1.

DETAILED DESCRIPTION

Figure 1:
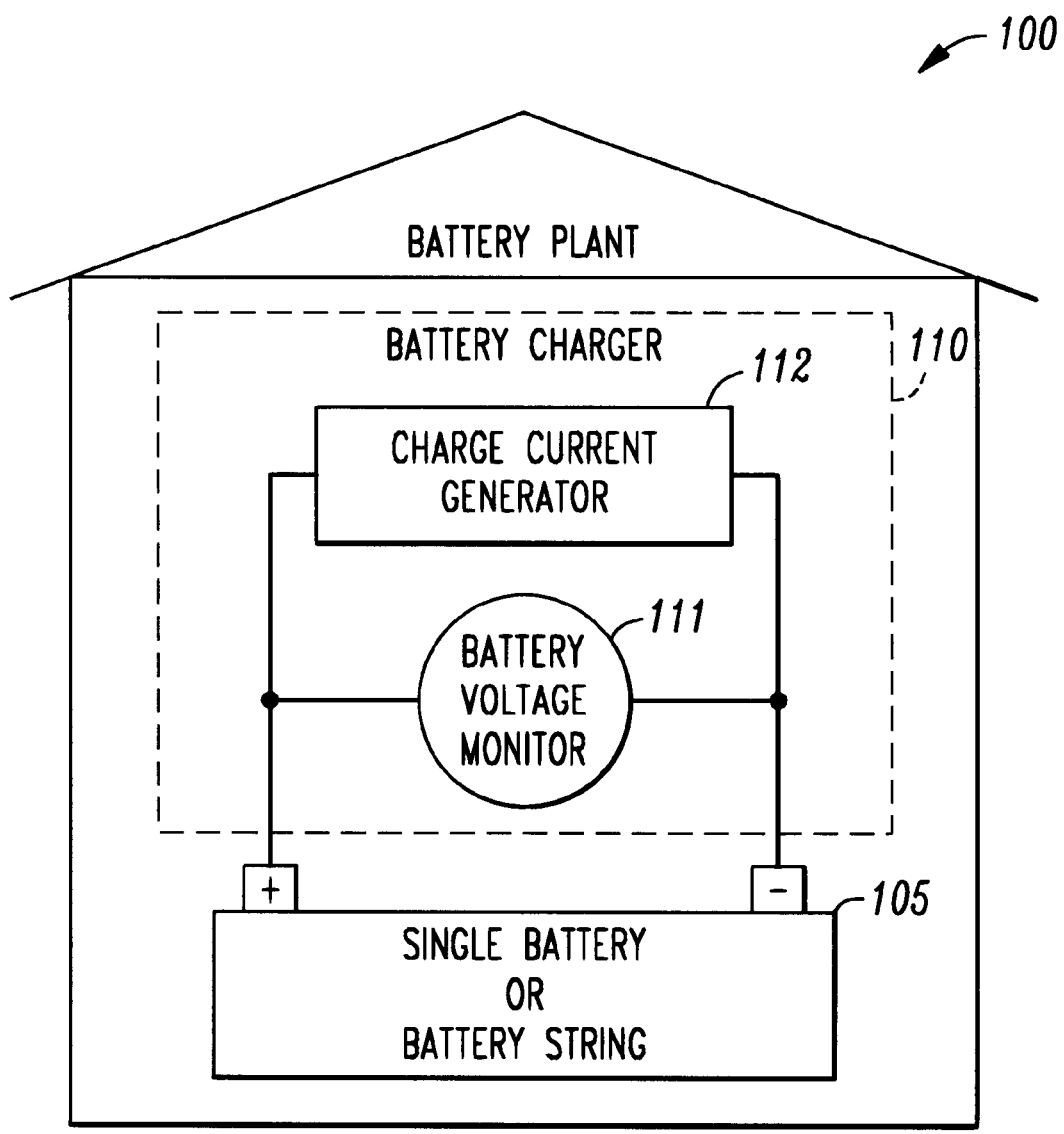
FIG. 1 illustrates a battery plant containing a battery charger constructed according to the principles of the present invention.

Referring initially to FIG. 1, illustrated is a battery plant, generally designated 100. The battery plant 100 contains a battery charger 110 constructed according to the principles of the present invention. The battery plant 100 includes a battery 105, which may be either a single battery or a battery string containing several batteries and the battery charger 110. The battery charger 110 further includes a battery voltage monitor 111 and a charge current monitor 112. The battery voltage monitor 111 measures a voltage of the battery 105. The charge current generator 112, coupled to the battery voltage monitor 111, provides an incrementally adjustable charge current to the battery 105 based on the voltage measurement.

In this manner, adjustments to charge current levels are based on battery voltage measurements, such that the rate at which the battery charger 110 charges the battery 105 depends upon the response of the battery 105. The present invention is not limited to a particular voltage; the battery charger 110 can monitor any voltage associated with the battery 105. However, in the illustrated embodiment, the battery charger 110 monitors a voltage of the battery 110 at its terminals, as shown. The voltage measured can be instantaneous, a change in voltage over time (i.e., a slope) or any derivative or combination thereof.

The charge current generator 112 operates in an initial charge mode in which the incrementally adjustable charge current generally assumes one of at least two intermediate current levels based on the voltage of the battery 105. In the illustrated embodiment, the charge current generator 112, associated with the battery charger 110, assumes one of four intermediate current levels in addition to zero and a maximum level. The intermediate and maximum levels can be set at any absolute value and do not need to be evenly spaced apart. Additionally, the charge current generator 112, operating in the initial charge mode, decrements the incremental adjustable charge current when the voltage of the battery 105 reaches an upper limit. The upper limit can be set at any absolute value, and may be caused to change over time in some embodiments of the present invention.

In the illustrated embodiment, the charge current generator 112 also operates in a maintenance mode in which the incremental adjustable charge current toggles to zero from a single higher value when the voltage of the battery 105 reaches an upper limit. This maintenance mode upper voltage limit may be the same as the upper voltage limit in the initial charge mode. Of course, the maintenance mode upper voltage limit and the initial mode upper voltage limit may also be different.

The charge current generator 112, while operating in the maintenance mode, may also toggle the incremental adjustable charge current from zero to a single higher current value when the voltage of the battery 105 reaches a lower limit. The single higher current level provided may typically be one of the four intermediate levels that the charge current generator 112 assumed in the initial charge mode, although this need not be the case. Toggling the incremental adjustable charge current supplied by the charge current generator 112 causes the lower voltage limit of the battery 105 to increase over time. This lower voltage limit typically increases to reflect an increase in the capacity of the battery 105 over time. The present invention does not require that the lower voltage limit rise, and is not limited to a particular time to initiate a rise or rate of rise.

A discharge event causes the battery charger 110 to shift from a maintenance mode to an initial charge mode. The discharge event may be defined by a battery voltage excursion of a given minimum magnitude or a discharge rate over a given period of time.

During both initial charge and maintenance modes, proper conditioning of the battery 105 is inherent to the charging scheme. The ideal maximum voltage is dependent on temperature of the battery 105. Therefore, to avoid exposing the battery 105 to an over-voltage condition (which may cause premature gassing), the thermal condition of the battery 105 is monitored to determine a safe upper voltage limit thereby avoiding a thermal event wherein the battery 105 overheats. If a shorted cell is sensed in the battery 105 during the maintenance mode, the upper voltage limit may advantageously be decreased to prevent additional current from flowing into the battery 105 (which could prompt a thermal event).

During an initial charge mode, either at initial power up or after a discharge event, an initial increment of charge current is supplied to the battery 105 by the charge current generator 112. As the voltage of the battery 105 increases, as measured by the battery voltage monitor 111, the charge current is increased in a step-wise manner that is proportional to the measured voltage of the battery 105. By incrementally increasing, decreasing or bidirectionally adjusting the charge current, the efficiency of the battery charger 110 is increased, conditioning the battery 105 in an optimum manner.

By decreasing the charge current at the upper voltage limit for the battery 105, the voltage of the battery 105 "folds back" (decreases). The charging process continues with increased capacity of the battery 105, thereby increasing charge efficiency. When the upper voltage limit is achieved again, the incremental charge current is decreased again in a step-wise fashion and the process is repeated until the battery 105 reaches its full capacity. This process minimizes or avoids gassing of the battery 105. Gassing is most likely at this point.

Once the battery 105 reaches its full capacity, the charge current is typically maintained at a constant value but is cycled on and off with a frequency determined by the capacity of the battery 105. The capacity is determined by the rate of charge and discharge based on battery voltage. This process maintains the voltage of the battery 105 between a maximum charge value and a minimum charge value and is used to monitor battery capacity. This effectively produces an average charge current value that exercises the battery 105 properly and contributes to increase battery life. Additionally, monitoring of the thermal condition of the battery 105 is done continuously allowing an adjustment in the safe upper voltage limit during all charge modes including initial charge mode, charge mode as well as other modes of operation.

Turning now to FIG. 2, illustrated is a waveform 200 showing representative voltage and current waveforms for the battery charger 110 of FIG. 1. A charge current waveform 205 and a corresponding battery voltage waveform 210 indicate the various steps and activities of the battery charger 110. An initial charge mode starts in a step 1 wherein a charge current supplied by the charge current generator 112 is seen to incrementally increase dependent on a measured battery voltage determined by the battery voltage monitor 111. The charge current increases incrementally until a step 2 where the maximum allowed current is supplied and the voltage of the battery 105 reaches an upper voltage limit. In each of the intermediate charge current levels, the thermal condition of the battery 105 is monitored to assure that the charge current and associated battery voltage are consistent with avoiding a thermal event. This monitoring allows for optimizing charger efficiency, minimizing charger size and use as a first time battery charger.

Next, in a step 3, the charge current decreases to an intermediate level. The battery voltage is seen to decrease slightly or foldback and then to increase, until the battery voltage again reaches the upper voltage limit. At this point, the charge current is again reduced to a lower value, and the battery voltage is seen to follow the pattern indicated before where it again reaches the upper voltage limit. Then, in a step 5, the charge current is reduced to a value of zero wherein the battery voltage is seen to decrease to a lower voltage limit.

At this point, the intermediate value of charge current that existed before is reapplied to the battery 105, and the battery voltage is seen to increase to the upper voltage limit again. The charge current is again cycled to a value of zero wherein the battery voltage again decreases. This process continues until the discharge slope of the battery voltage is seen to decrease to a point where the lower threshold cannot be reached within a given time. At this point the charge current is reapplied while the minimum battery voltage is greater than the lower voltage limit.

The process continues in a step 6 wherein the charge current is seen to reside at a value of zero for longer periods of time. This action continues the maintenance mode of operation for the battery charger 110. This action produces a lower voltage limit that is seen to increase toward an asymptotic value of battery voltage as indicated by the dashed line on the battery voltage waveform 210. This asymptotic value of battery voltage will typically approach a value at or near the upper voltage limit and indicates that the battery 105 is increasing in its capacity to store energy. An average value of charge current used to produce this corresponding increase in battery capacity is indicated by the dashed line on the charge current waveform 205.

Although the present invention has been described in detail, those skilled in the art should understand that they can make various changes, substitutions and alterations herein without departing from the spirit and scope of the invention in its broadest form.

What is claimed is:

1. A battery charger, comprising:
   a battery voltage monitor that measures a voltage of a battery; and
   a charge current generator, coupled to said battery voltage monitor, that provides an incrementally adjustable charge current to said battery based on said voltage.

2. The battery charger as recited in claim 1 wherein said charge current generator operates in an initial charge mode in which said incrementally adjustable charge current assumes one of at least two intermediate levels based on said voltage.

3. The battery charger as recited in claim 1 wherein said charge current generator operates in an initial charge mode in which said incremental adjustable charge current decrements when said voltage reaches an upper limit.

4. The battery charger as recited in claim 1 wherein said charge current generator operates in a maintenance mode in which said incremental adjustable charge current toggles from zero to a single higher value when said voltage reaches a lower limit.

5. The battery charger as recited in claim 4 wherein said charge current generator increases said lower limit over time.

6. The battery charger as recited in claim 1 wherein said charge current generator operates in a maintenance mode in which said incremental adjustable charge current toggles to zero from a single higher value when said voltage reaches an upper limit.

7. The battery charger as recited in claim 1 wherein a discharge event causes said battery charger to shift from a maintenance mode to an initial charge mode.

8. A method of charging a battery, comprising:
   monitoring a voltage of a battery; and
   incrementally adjusting a charge current to said battery based on said voltage.

9. The method as recited in claim 8 wherein said incrementally adjusting comprises using one of at least two intermediate levels based on said voltage in an initial charge mode.

10. The method as recited in claim 8 wherein said incrementally adjusting comprises decrementing said charge current when said voltage reaches an upper limit.

11. The method as recited in claim 8 wherein said incrementally adjusting comprises operating in a maintenance mode in which said incrementally adjustable charge current toggles from zero to a single higher value when said voltage reaches a lower limit.

12. The method as recited in claim 11 wherein said incrementally adjusting comprises increasing said lower limit over time.

13. The method as recited in claim 8 wherein said incrementally adjusting comprises operating in a maintenance mode in which said incremental adjustable charge current toggles to zero from a single higher value when said voltage reaches an upper limit.

14. The method as recited in claim 8 further comprising:
   at least partially discharging said battery; and
   subsequently shifting from a maintenance mode to an initial charge mode.

15. A battery plant, comprising:
   a battery string;
   a battery voltage monitor, coupled to said battery string, that measures a voltage of said battery string; and a charge current generator, coupled to said battery voltage monitor, that provides an incrementally adjustable charge current to said battery string based on said voltage.

16. The battery plant as recited in claim 15 wherein said charge current generator operates in an initial charge mode in which said incrementally adjustable charge current assumes one of at least two intermediate levels based on said voltage.

17. The battery plant as recited in claim 15 wherein said charge current generator operates in an initial charge mode in which said incremental adjustable charge current decrements when said voltage reaches an upper limit.

18. The battery plant as recited in claim 15 wherein said charge current generator operates in a maintenance mode in which said incremental adjustable charge current toggles from zero to a single higher value when said voltage reaches a lower limit.

19. The battery plant as recited in claim 18 wherein said charge current generator increases said lower limit over time.

20. The battery plant as recited in claim 15 wherein said charge current generator operates in a maintenance mode in which said incremental adjustable charge current toggles to zero from a single higher value when said voltage reaches an upper limit.

21. The battery plant as recited in claim 15 wherein a discharge event causes said battery charger to shift from a maintenance mode to an initial charge mode.

* * * * *